United States Patent [19]

Cunningham

[11] 4,055,370
[45] Oct. 25, 1977

[54] DYNAMOELECTRIC MACHINE LUBRICATION SYSTEM AND METHOD OF ASSEMBLING THE SAME

[75] Inventor: Eldon R. Cunningham, Fort Wayne, Ind.

[73] Assignee: General Electric Company, Fort Wayne, Ind.

[21] Appl. No.: 694,307

[22] Filed: June 9, 1976

[51] Int. Cl.² .......................... H02K 5/16; F16C 33/74
[52] U.S. Cl. .................................. 308/36.1; 308/132; 310/90
[58] Field of Search ...................... 310/90, 88; 308/78, 308/132, 36.1, 125; 252/14

[56] References Cited
U.S. PATENT DOCUMENTS

| | | | |
|---|---|---|---|
| 3,164,422 | 1/1965 | Shaffer et al. | 308/132 |
| 3,793,543 | 2/1974 | Stokke | 308/132 X |
| 3,885,176 | 5/1975 | Cunningham | 308/36.1 X |

*Primary Examiner*—Robert R. Song
*Assistant Examiner*—Gene A. Church
*Attorney, Agent, or Firm*—Ralph E. Krisher, Jr.

[57] ABSTRACT

An illustrated lubrication arrangement substantially prevents end leakage oil from flowing along the shaft to an oil thrower, and also causes end leakage oil to recirculate through wicking material to a feed wick which in turn feeds oil to a bearing clearance. A feed wick includes a feeding portion that extends through an window in the bearing and contacts the shaft. This same wick includes recirculatory pick-up wicks that protrude into a capillary oil collection region at each end of the bearing. The pick-up wicks have a smaller cumulative effective axial length than the feeding tab of the wick. The pick-up wicks also contact the shaft, and they recirculate end leakage oil to the feeding tab because of gradients in oil content within the wicking that interconnects the pick-up wicks with the feeding tab. The pick-up wicks and feeding tab may actually be separate pieces, the capillary interstices of which communicate with each other.

One method includes positioning a feed wick so that it is pushed toward the shaft by its ends, and the material from which the feed wick is made will act as a beam which limits the amount of pressure between the shaft, feed wick, and pick-up tabs. Moreover, the wick structure preferably is sway-backed to facilitate assembly of the wick in the bearing lubrication cavity, and to establish a re-oiling cavity.

17 Claims, 14 Drawing Figures

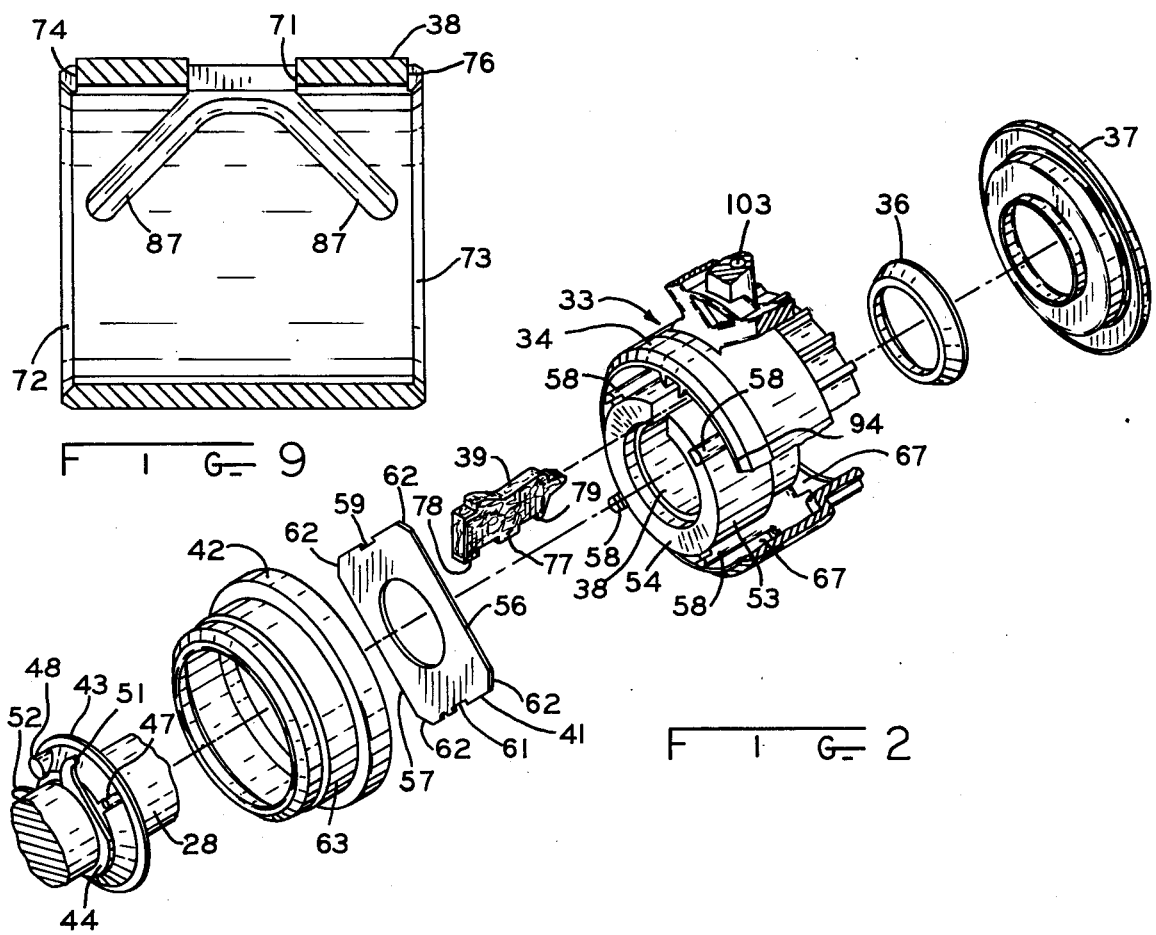
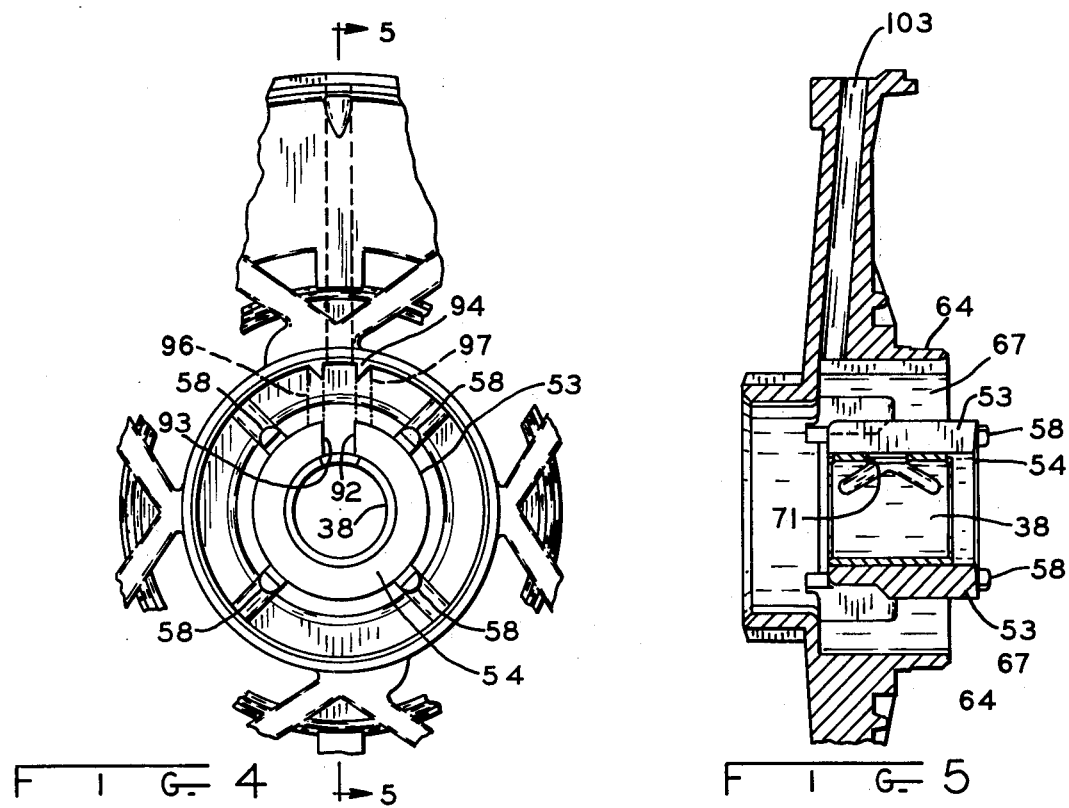

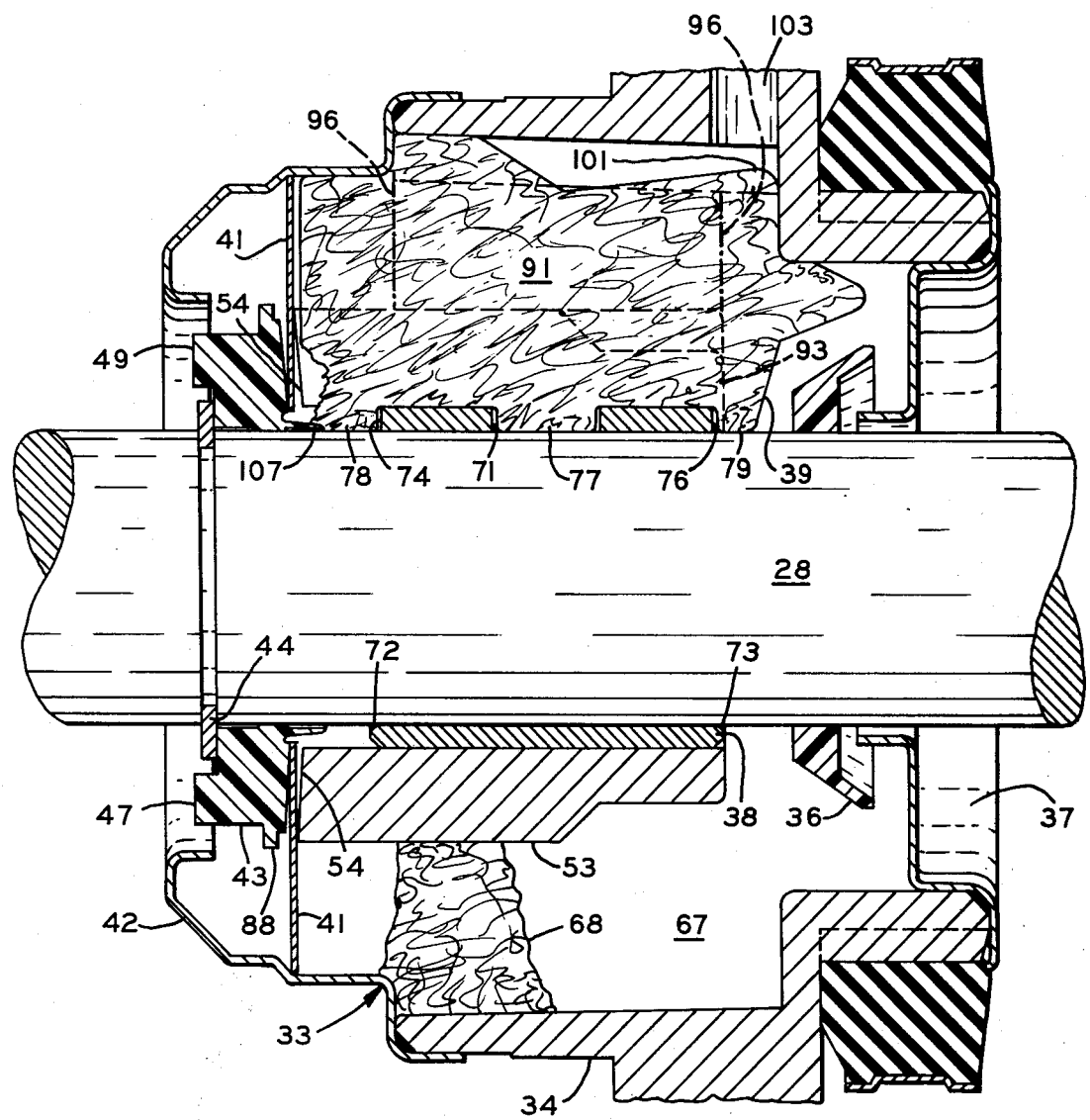
FIG. 3
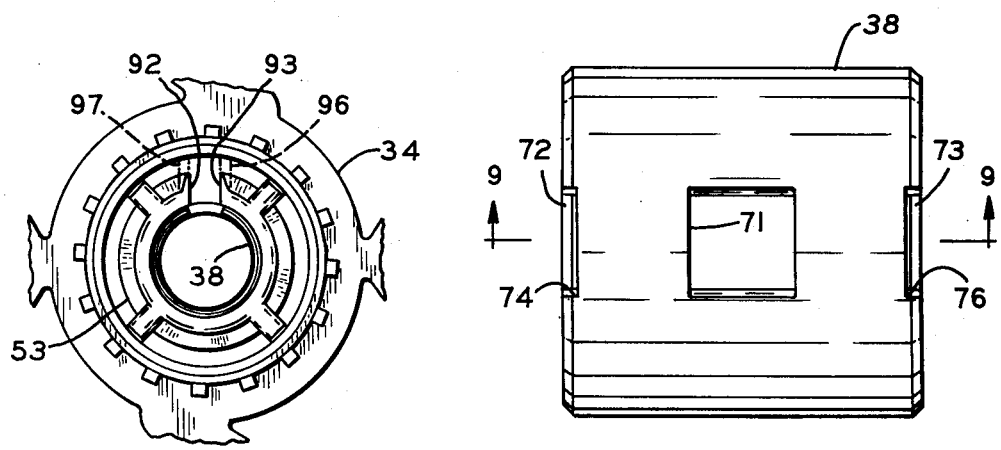
FIG. 6
FIG. 8

DYNAMOELECTRIC MACHINE LUBRICATION SYSTEM AND METHOD OF ASSEMBLING THE SAME

BACKGROUND OF THE INVENTION

The present invention relates generally to dynamoelectric machines and, more particularly, to new and improved dynamoelectric machine lubrication systems and methods of assembling the same.

In dynamoelectric machines such as electric motors (and some generators and alternators), sleeve bearing systems are used wherein an oil supply or reservoir is contained in the vicinity of a bearing. In some cases, this oil is stored within the interstices of lubricant storage material. The lubricant storage material may be, for example, pieces of wool felt, fibers of chopped materials (such as, for example, materials of the type shown and described in U.S. Pat. No. 2,966,459; or materials of the type that are disclosed in Whitt U.S. Pat. Nos. 3,894,956 and 3,907,690). An example of a wool felt oil storage system is shown in my own prior U.S. Pat. No. 3,235,317 which issued Feb. 15, 1966.

Some motors are provided with sealed bearing housings so designed that it is difficult, if not impossible, to supply additional oil to the bearing system once the motor has been put into use. Obviously, with this type of motor, the useful life of the motor is related to the life of the bearing, and therefore is usually limited to the time required for the amount of oil stored in the oil system to decrease to a critical quantity such that the rate of feed of oil into the bearing clearance will have decreased to a point so that there will be insufficient lubricant to prevent a rapid increase in bearing friction and wear. One practical measure of when friction and wear has become excessive is when friction becomes so great that it prevents the motor from starting, or when wear causes a loss of the magnetic air gap; or when increased noise levels resulting from wear cannot be tolerated.

It will be understood that many motors are provided with means that permit periodic re-oiling of the lubrication system. Such an arrangement is illustrated, for example, in my above-mentioned U.S. Pat. No. 3,235,317. However, motors are not always re-oiled as frequently as they should be once they have been put into service. Moreover, even if motors are re-oiled at the manufacturer's recommended time intervals, the longer periods of time between re-oiling usually are a substantial convenience to an end user. The period of time (for a given motor) between re-oiling is also related to the time required for the amount of oil stored in the system to decrease to a critical quantity such that the rate of feed of oil into the bearing clearance has decreased to a value that it will not prevent a rapid increase in bearing wear and friction.

It should now be understood that it would be generally desirable to provide new and improved bearing lubrication systems, as well as methods of manufacturing and assembling the same, such that it will take relatively longer before the stored oil is depleted to a critical quantity.

In aplications where motors will be re-oiled at specified maintenance intervals; any improvements in bearing systems that diminish the amount of oil loss from a bearing system may provide the further advantage of permitting a reduction in the volume required for oil storage, or a reduction in the amount of oil provided initially in the bearing and lubrication system. This is of obvious benefit from the standpoint of conservation of motor lubricants and raw materials from which such lubricants are made.

Much work has been done heretofore to minimize loss of oil from bearing and lubrication systems of dynamoelectric machines. For example, substantial amounts of work have been done in connection with providing improved oil flingers or flingers which will be more efficient in returning oil to the oil retention system or oil storage system after the oil has migrated along the length of the shaft and out along the bearing journal and to the end of the bearing. Stokke et al U.S. Pat. No. 3,793,543, assigned to the assignee of this application, is evidence of some of the work that has been done in this particular area.

SUMMARY OF THE INVENTION

Accordingly, it is a general object of the present invention to provide a new and improved bearing and lubrication system whereby the time required for a given quantity of stored oil to reach a critical feed rate will be increased and, where possible, maximized.

A more specific object of the present invention is to substantially reduce, if not prevent or eliminate, movement of oil flowing from the end of a bearing (termed "end leakage" in technical literature) along the shaft to an oil thrower.

Another object of the present invention is to provide new and improved bearing and lubrication systems where it can be assured that "end leakage" oil will recirculate to the oil storage reservoir or bearing feed wick.

It is an even more specific object to provide an improved feeder wick having a pair of end contactor or recirculatory wicks interfitted with a new and improved bearing configuration whereby end leakage oil will recirculate through wicking because of local gradients in oil content within the wicking.

Yet another object is to provide a new and improved method for assembling combined feed and recirculatory feed wick elements within a bearing housing.

In carrying out the above and othe objects, I provide a new and improved bearing and lubrication system that includes numerous improvements and numerous novel structural features, some of which may be utilized alone; or all of which may be utilized in combination to provide a most preferred and improved bearing and lubrication system. I also provide new and improved assembly methods and procedures; and thrust absorbing means.

In one illustrated form, I provide means that substantially prevent end leakage oil from flowing along the shaft to an oil thrower, and that also cause end leakage oil to recirculate through wicking material to a feed wick, also subsequently referred to as a feed tab, tip or tail, which in turn feeds oil to the bearing clearance. In one preferred form, the feed wick includes a feeding portion that extends through a window in the bearing and contacts the shaft. This same feed wick includes recirculatroy pick-up wicks, also subsequently referred to as pick-up tabs, tips or tails that protrude into a capillary oil collection region at each end of the bearing established by circumferentially extending capillary walls. The pick-up wicks have a smaller cumulative axial length than the feeding tab of the wick. Preferably, the pick-up wicks also contact the shaft, and they recirculate the end leakage oil to the feeding tab because of gradients in oil content within the wicking that interconnects the pick-up wicks with the feeding tab. In modified embodiments, the pick-up wicks and feeding tab may actually be separate pieces, the capillary interstices of which communicate with each other.

In one illustrated form the inner diameter ends of the bearing are chamfered according to prior practice to establish an oil collection region, that is, to provide a capillary space or passage that tends to circulate oil from the pressure side of the bearing to the unloaded side of the bearing. However, as will be understood, this circumferentially extending capillary space would eventually fill with end leakage oil and then oil could creep out along the shaft to the oil throwers. In embodiments of the present invention, filling up of the circumferentially extending capillary or capillary space and ultimate creepage of end leakage oil is substantially reduced, if not eliminated, because notches or windows at the ends of the bearings accommodate the pick-up wicks, the capillary action of which recirculates oil to the feeding tab. Thus, as oil begins to accumulate in the inner diameter bearing chamfer, if moves into and is absorbed by the pick-up wicks and thence is recirculated to the feeding tab.

If slots were not provided in the ends of the bearing (as shown in FIG. 8 of my above-referenced U.S. Pat. No. 3,235,317), a greater oil mass would accumulate in the bearing chamfer before the pick-up tabs could begin to recirculate the oil. Moreover, this increased oil mas would then contribute to creepage of oil along the shaft to the oil throwers.

In operation of embodiments illustrated herein, oil moves along the shaft from the feed window of the bearing, begins to fill the chamfer along at least one end of the bearing, and then the pick-up tabs wick up the oil and recirculate it to the feeding tab. Preferably, the axial length of the notch at each end of the bearing will be no greater than the axial length of the internal bearing chamfer, but it does not appear that it is critical that the axial notch length be so limited. Without the internal chamfer at each end of the bearing, oil could creep along the shaft and virtually no recirculation of oil within the feed wick could be provided, even if a notch were provided for pick-up tabs. However, with internally chamfered and notched bearing ends, the internal chamfers tend to act as mini-reservoirs, and the pick-up tabs augment recirculation of the oil during operation and also feed oil to the ends of a bearng during starting conditions.

The rate of oil that is wiped onto a shaft is a function of the axial length of the contact between the feed wick and the shaft, and it is desirable for the feed wick to draw oil from the oil reservoir at a greater rate than the pick-up tabs. Thus, the pick-up tabs are of less effective axial length than the feed wick at the wick to shaft interfaces. A greater local depletion of oil content in the feed wicking in the vicinity of the feeding tab will occur (as compared to the pick-up tabs). This localized depletion then will cause oil to flow from the pick-up tabs to the more depleted region of the feed wick. This depletion then ensures that the feed wick will pick up the end leakage oil and recirculate it to the feed wick. In some applications, it will also be desirable to provide shield or barrier means that will inhibit the supply of oil directly to the feed wick from the reservoir. This then can further ensure that oil supplied to the feed wick will be supplied from the wicking associated with the pick-up tabs.

The pick-up tabs can span the circumference of the shaft (or bearing end) various amounts, from a few degrees up to the full circumference. However, it will be generally less expensive and easier to assemble feed wicks that utilize a minimum of material and a minimum of parts as illustrated herein. It will be understood, however, that the recirculatory wick tabs need not be limited to the same circumferential span as each other or as the feed wick, because the pick-up tabs can be made from porous materials that can be molded to various shapes and proportions. For example, compacted and sintered metal powders, or porous plastics may be formed by currently available processes to complex shapes.

A typical unitary or one-piece feed wick with two pick-up tabs or tails can span as little as 10% (approximately) of the shaft circumference and yet meet the functional needs of the feed wick tab for feeding oil to the bearing. If the feed wick and pick-up tabs (as well as the portions interconnecting the wick and tabs) are cut from a sheet of material of a given thickness, then the circumferential span of the feed wick and pick-up tabs will be uniform.

As previously mentioned, the axial length of the bearing end notches preferably is related to the axial length of the internal end chamfers of the bearing. By having the notches terminate generally at the apex of the internal chamfer, the transfer of lubricant to the pick-up tabs will be enhanced.

Recirculation of oil from chamfers to the low pressure side of a bearing is reduced at lower shaft speeds, and thus, the present invention will be of relatively greater value and benefit for motors that operate at relatively slower four-pole or six-pole speeds. However, it should be understood, that the invention may also be utilized to good advantage in two-pole motors.

From time to time, most of the circulatory flow in the bearing end chamfers may re-enter the bearing clearance in regions due to the suction or negative pressure created in that portion of the clearance space. However, such recirculation cannot be assured at all times due to a number of different factors. As is well known, some of these factors are: greater than usual misalignment between bearing and journal surfaces; the "screw pump effect" caused by any surface finish on the journal and bearing which is helical in nature; low journal speeds; low lubricant viscosity; and gravity forces which might tend to concentrate the oil along the bottom region of the chamfer. For example, when the size of an oil droplet formed at the lowest point of the bearing exceeds the surface tension forces of the oil, some oil will escape from the chamfer. Constructions embodying my invention, however, prevent an unduly large accumulation of oil and its subsequent escape due to end leakage.

When carrying out my invention, the axial and circumferential extent of the pick-up tabs can be varied to provide the desired capacity for absorption of end leakage oil for any given bearing design. In addition, barrier means can further enhance recirculation from a pick-up tab to the feed wick.

In preferred applications, the feed wick is positioned within a bearing cavity so that it is pushed toward the shaft by its ends, and the material from which the feed wick is made will act as a beam which limits the amount of pressure between the shaft, feed wick, and pick-up tabs. Moreover, the wick structure preferably is swaybacked to facilitate assembly of the wick in the bearing lubrication cavity, and to establish an air pocket or space that serves as a re-oiling cavity.

In the practice of one preferred method, a feed wick combined with two pick-up tabs is moved axially along the outside of a bearing holder, tilted in a first direction as a first pick-up tab crosses a feed window, tilted in the opposite direction just after the feed wick moves past a first bearing end notch, and then further moved in an axial direction while a leading end of the combined wick is cammed into a final position by part of the bearing housing of a motor end shield.

The subject matter which I regard as my invention is set forth in the claims appended to and forming a part of this specification. The invention itself, however, together with further objects and advantages thereof may be better understood by referring to the following more detailed description taken in conjunction with the accompanying drawings.

BRIEF DESCRIPTION OF THE DRAWINGS

FIG. 2 is an exploded perspective view of a portion of a bearing and end frame assembly taken from the motor shown in FIG. 1;

FIG. 3 is a side elevation, with parts in section and parts broken away, of a portion of the motor structure shown in FIG. 1;

FIG. 4 is a view of a portion of the pulley-end end frame of the motor of FIG. 1 taken generally in the direction of the arrows IV—IV on FIG. 1;

FIG. 5 is a view taken generally in the direction of the arrows of V—V on FIG. 4;

FIG. 6 is a view of the reverse side of a portion of the structure shown in FIG. 4;

FIG. 8 is view of one of the sleeve bearings that is best shown in FIG. 3;

FIG. 9 is a view taken in the direction of the arrows IX—IX on FIG. 8;

DESCRIPTION OF THE PREFERRED EMBODIMENTS

Figure 1:
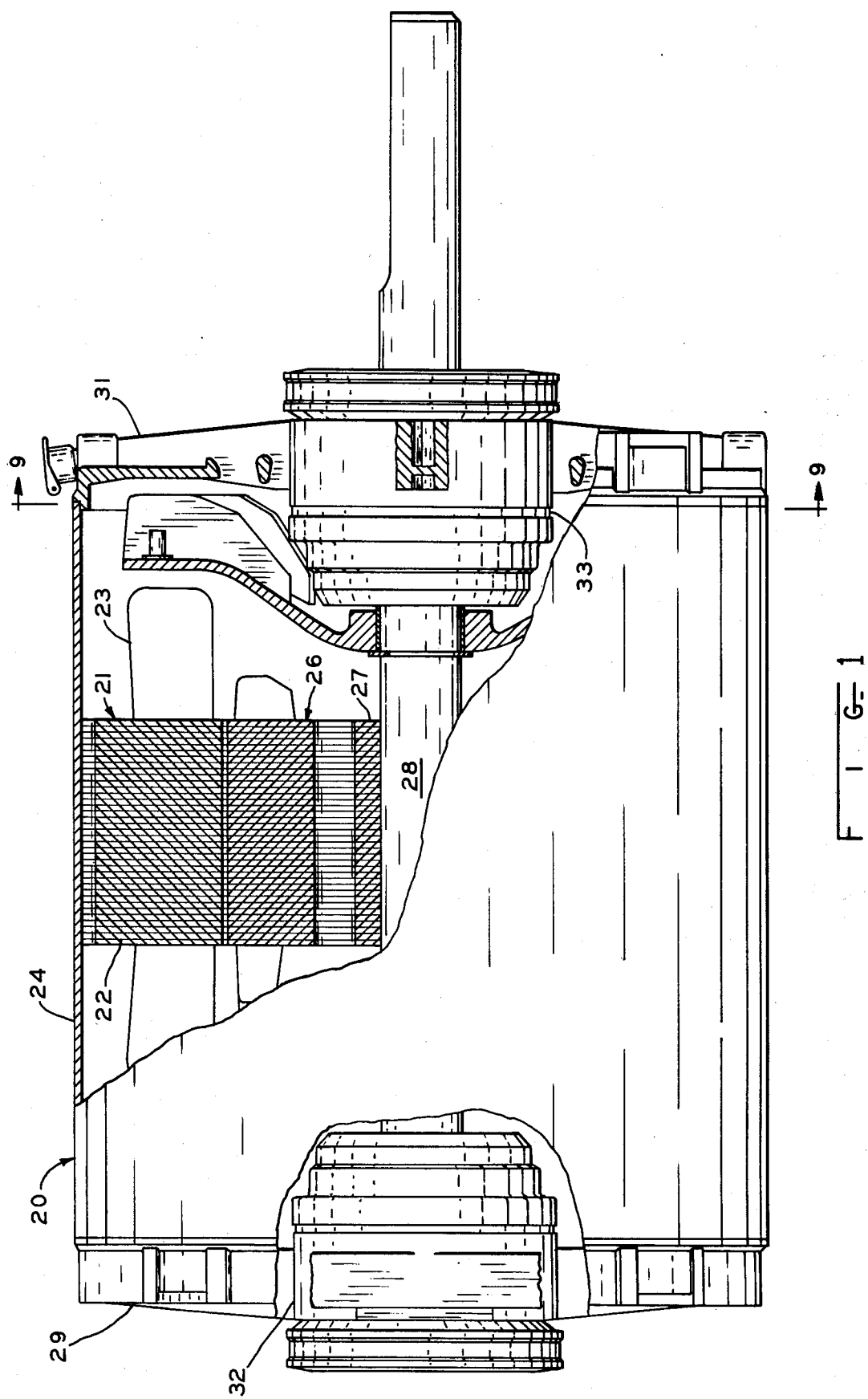
FIG. 1 is a side elevation, with parts in section, parts removed, and parts broken away, of a motor that includes lubrication systems embodying the present invention in one form.

Turning now to the drawings in more detail, I have shown a motor 20 that includes a conventional wound stator assembly 21 that in turn is comprised of a magnetic core 22 and an excitation winding 23. The stator assembly is carried by a shell or housing 24, and disposed within the bore of the stator assembly is a rotor assembly 26 that includes a rotor core 27 having a squirrel cage winding thereon and a shaft 28. The motor of FIG. 1 is a two-bearing type of motor, and bearings are carried at each end of the motor by the end frames 29, 31. However, the present invention may be embodied in single or unit bearing motors as well as multiple bearing motors as will be understood.

It will be understood that the motor 20 may be single or poly-phased, and it may be single or multi-speed. Moreover, the motor 20 may be a shaded pole or induction motor; and particular details of the staor assembly, rotor assembly, shell, and end frames (in general) may be chosen as desired by persons skilled in the art for any given application.

The motor 20 includes two lubrication and bearing system generally denoted by the reference numerals 32 and 33, the internal parts of which are substantially identical one to the other. The systems 32 and 33 each embody features of the present invention, and, because of their similarity one to another, only one of them is described in more detail herein.

Since a description of details of stator cores, stator windings, rotor assemblies and housings are not necessary for an understanding of the present invention, further description of the same is not presented herein; and the reader is referred to the patents identified hereinabove for details of such parts. Particular lubrication materials are presently of interest and, for that reason primarily, the disclosures of all of the above-identified patents are incorporated herein by reference.

Turning now to FIGS. 2 and 3, the bearing and lubrication system 31 will now be discussed in more detail (it being noted that parts have been broken away and removed in order to simplify the drawings herein). The system 33 includes hub portion 34 of the end frame 31; oil slinger 36; outer oil well cover 37; sleeve bearing 38; combination wick 39; thrust plate 41; inner oil well cover 42; thrust runner 43; and snap ring 44 which is carried in a groove on shaft 28 and can interfit in interlocking engagement with bosses 47–49 on thrust runner 43.

The snap ring 44 is locked against rotation relative to shaft 28, and ears 51, 52 will lock against tabs 47 or 49 on the thrust runner 43 if the latter starts to slip on the shaft. Thereafter, as will be understood, the thrust runner 43 will rotate without slippage relative to the shaft.

It will be observed from FIGS. 3 and 5 that the center feed bearing 38 is carried by an internal hub 53, one face of which is tapered to form a generally frusto-conical surface 54 against which thrust plate 41 may be deflected in response to thrust loading that causes thrust runner 43 to move to the right as viewed in FIG. 3.

The thrust plate 41 is rectangular, and dimensioned so that the sides 56, 57 will fit loosely between two opposite posts 58 that extend from the internal hub 53; and so that notches 59, 61 will slip loosely past the other two posts 58. The corners of the plate 41 have been removed as shown at 62, and the distance between any two diagonally opposite flats 62 is the same and also of a length corresponding to the inner diameter of portion 63 of the oil well cover 42. Then, when cover 42 is centered on the machined surface 64 of an end frame (see FIG. 5), the shaft accommodating hole 66 will be concentric with the centrally mounted bearing 38.

The interior region 67 of the system 33 (see FIG. 3) generally surrounds the internal hub 53, and this region is filled with an oil impregnated storage material or oil absorbent mass. In the illustrated embodiment, storage material has been shown in part at 68 in FIG. 3 as an extrudable base such as that disclosed in the above-referenced Whitt Patents (the disclosures of which are incorporated herein by reference). However, other storage material may be used in lieu of material 68. For example, soft wool felt or oil soaked, fibrous materials such as those sold by Permawick Corporation (of Detroit, Mi.) under the name "Permawick" may be used.

Figure 7:
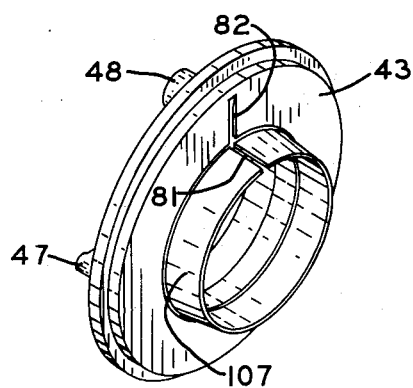
FIG. 7 is a perspective view of a thrust runner that is also shown in FIG. 2.

With collective reference now to FIGS. 4–6, 8, and 9, it will be noted that bearing 38 is provided with a center feed window, and internal end chamfers 72, 73 that establish a capillary spacing with shaft 28. In addition, end notches 74, 76 extend to the apex of the internal chamfers for a purpose to be explained now in connection with FIGS. 2, 3, and 7.

The wick 39 includes a feed wick or tab 77 (disposed in the window 71) and two recirculatory pick-up tabs 78, 79 that fit, respectively, in notches 74, 76. The tab 78 also feeds oil (as will be understood) to thrust runner 43 which feeds oil via capillary passages 81, 82 to face 83 of the thrust runner.

Prior to motor operation, oil is supplied from the storage reservoir to the wick 39 and thence to all three tabs 78, 77, and 79. However, after the motor has been running for a while, the felt in the vicinity of feeding tab 77 will be depleted of oil somewhat because the oil therein will be feeding into the bearing clearance (and along feed grooves 87 when they are optionally provided). Oil fed from tab 77 will be pumped primarily toward tab 78 or 79, depending on the direction of shaft rotation, shaft surface finish, and so forth as discussed hereinabove. Part of the oil so pumped will be collected in the capillary spacing established by an internal chamfer 72 or 73 (as the case may be) and recirculated to the suction side of the bearing. However, the balance of the oil being fed to the end capillary 72 or 73 of the bearing will be wicked into the pick-up tab at that end of the bearing with the result that the internal capillary structure or interstices of such pick-up tab will be relatively filled with oil. However, since the portion of the wick 39 in the vicinity of feeding tab 77 will be at least somewhat depleted of oil, oil will recirculate from the pick-up tab to the region of the feeding tab 77. This arrangement will thus ensure that a minimum amount of end leakage oil will migrate along the shaft 28 to oil slinger 36 or the slinger portion 88 of thrust runner 43 and thus minimize the loss of oil from the system through the central opening of the cover 37 (see FIG. 3) or cover 42. It will be understood by now that the actual dimensions for the capillary grooves and chamfers mentioned may vary for different oils but generally will be in the order of about 0.010 of an inch to about 0.015 of an inch, all as will be understood.

It should now be appreciated that the amount of exposure of different portions of wick 39 to the reservoir material 68 may, in some cases, have an effect on the desired differential oil depletion condition of the parts of the wick near tabs 78, 77, and 79.

For example, if excessive surface portions of the wick 39 in the vicinity of feeding tab 77 are in contact with the reservoir oil storage material 68, oil may be fed to the wick 39 virtually as fast as it can flow to the tab 77 and the desired depletion differential would not exist. In this event, the amount of surface in the central portion 91 of wick 39 in contact with reservoir material 68 may be reduced. Such a reduction may be affected by changing the physical size and shape of the wick 39 or by reducing the ability of the wick 39 to absorb oil in the central portion 91 thereof. One way this may be done would be to glaze portions of the wick in the vicinity of region 91 so that the capillary interstices thereof would be blocked along the surface thereof. This blockage may also be accomplished by placing an oil impervious membrane of plastic tape or sheet material such as polyethylene along side of central portion 91 to reduce the rate at which oil can migrate thereto from the storage material 68.

Still another form of oil impervious membrane or barrier means may be provided by part of the bearing and wicking supporting structure. For example, reference to FIG. 6 will reveal that part of the central hub 53 has been removed to establish a wick accommodating channel defined by two side walls 92, 93. Moreover, in the structure shown in full lines in FIGS. 3, and 4, these side walls terminate radially inwardly from outer ring 94. The walls 93, 94 may be extended as indicated by phantom dash and dot lines at 96, 97 in FIGS. 4, 3, and 6 to establish solid barriers along the central portion of the wick 39 after it has been positioned therealong. Thus, when the end frame 31 is formed of die cast aluminum, the barrier means will be formed of the same material and at the same time as the remainder of the end shield.

Figure 10:
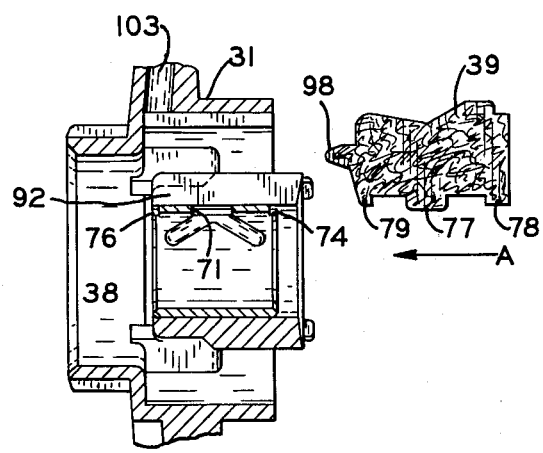
FIGS. 10-14 are sequential views of the relative positioning and spatial relationships of parts during the practice of procedural steps that embody the invention in another form thereof.
Figure 11:
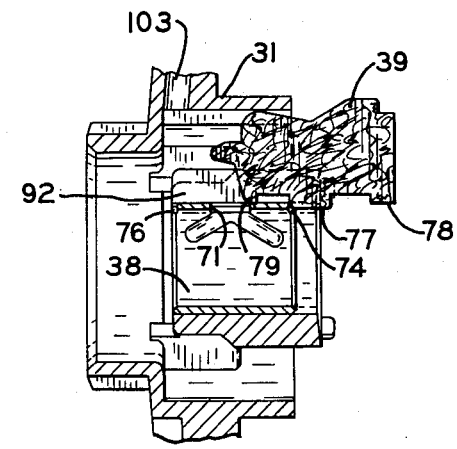

One preferred mode of assembly will now be discussed in conjunction with FIGS. 10-14. With reference first to FIGS. 10 and 11, the wick 39 is moved axially in the general direction of arrow A relative to the end frame 31. This direction of movement is generally parallel to the longitudinally extending axis along the bore of the bearing 38. The wick tip 98 then enters the end frame, and tip 79 moves past bearing end notch 76 and toward bearing window 71 as best revealed in FIG. 11.

Figure 12:
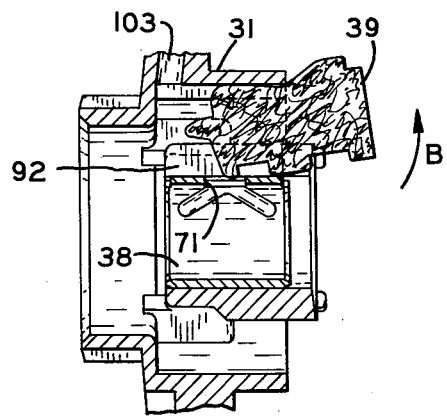

I thereafter tilt wick 39 by moving it in a direction as generally indicated by arrow B in FIG. 12 so that the feed tab 77 will be in a position to move along the outer surface of the bearing 39. Then, with continued movement in the axial direction shown by arrow A in FIG. 13, the wick 39 assumes the relative position shown in FIG. 13 and the leading tip or nose 98 impinges on the radiused corner 99 of the end shield (see FIGS. 13 and 14), and a re-oiling cavity 101 is established between the swayed back of the wick and the end shield.

Figure 13:
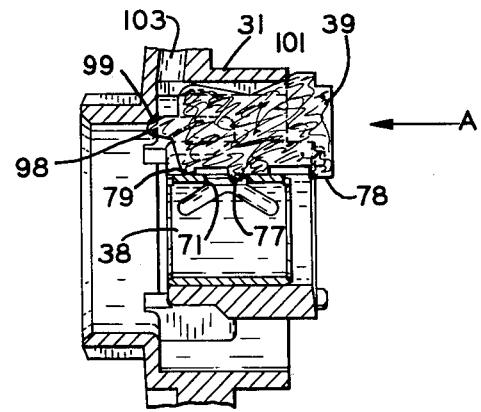
Figure 14:
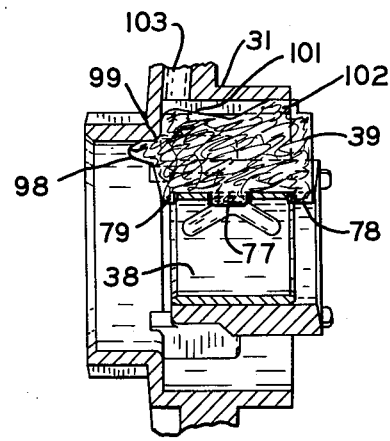

I then continue to move the wick in the direction of arrow A as shown in FIG. 13, and the rounded corner 99 cams the wick tip 98 toward the center of bearing 38 so that the wick tips 79, 77, 78 all snap into place and final position as best indicated in FIG. 14.

When the wick has been assembled as shown in FIG. 14, the tip 98 and end portion 102 are pressed against the end frame and thus urge the feed tip 77 through the bearing feed window. However, excessive feed tip to shaft pressure is not established because the portion of the wick between tip 98 and end portion 102 is, in effect, a rather easily deflectable beam and the wick body itself will deflect so that excessive pressure at the interface of feed tab 77 and the shaft may be avoided. FIG. 14 also reveals that final positioning of wick 39 establishes the location of the re-oiling cavity air pocket 101 adjacent to a re-oiling passage that is defined in the illustrated embodiment by re-oiler tube 103. This is also desirable because it will promote rapid absorption of oil added through tube 103 at the time of re-oiling.

As may be appreciated from the drawings, the axial length of the feed tab 77 along its interface with the shaft is slightly longer than the cumulative total effective length of the pick-up tabs axially along their interface with the shaft. "Effective" length is used herein to mean the length of the pick-up tabs that actually can contact the shaft, and thus, the length of tab 78 which overlies flange 107 of thrust runner 43 is not part of the "effective" length of tab 78. This relationship of relative lengths is desirable in order to promote the desired variations in oil depletion discussed hereinabove.

While the invention has now been explained by describing particular embodiments thereof, it should be now be apparent that changes may be made without departing from the invention. It is, therefore, intended in the following claims to cover all such equivalent variations that fall within the scope of my invention.

What I claim as new and desire to secure by Letters Patent of the United States is:

1. A dynamoelectric machine bearing and lubrication system comprising: an axially extending bearing having a centrally disposed lubricant feed window, a notch at each end thereof, and circumferentially extending capillary walls that establish circumferentially extending capillaries at each end of the bearing about a shaft accommodated in the bearing; and oil wicking means that includes a feeding tab disposed in the lubricant feed window, a first pick-up tip disposed in a first notch, and a second pick-up tip disposed in a second notch; said first pick-up tip and second pick-up tip each being in oil feeding communication with the feeding tab and in oil absorbing relation with a circumferentially extending capillary, whereby end leakage oil from the bearing is recirculated through the pick-up tips to the feeding tab.

2. The invention of claim 1 wherein the oil wicking means is formed from one piece of material, the feeding tab is centrally located in the material, and the axial ends of the material are urged radially toward the shaft.

3. The invention of claim 1 wherein an oil absorbent mass is contained in the system and is in oil feeding communication with at least part of the oil wicking means; and wherein the system further comprises barrier means for limiting the feeding of oil directly to the feeding tab from the oil absorbent mass.

4. The invention of claim 1 wherein the oil wicking means is a unitary piece of felted material.

5. The invention of claim 4 wherein the axial length of the feeding tab along its interface with the shaft is greater than the cumulative effective axial length of the first and second pick-up tips along their interfaces with the shaft.

6. In a dynamoelectric machine having a stator assembly, a rotor assembly including a shaft, and at least one bearing and lubrication system, the improvement wherein the at least one bearing and lubrication system includes an axially extending bearing having a lubricant feed window, a notch at at least one end thereof, and a circumferentially extending capillary wall which is interrupted by the notch and which establishes a circumferentially extending oil capillary passage at at least one end of the bearing about the shaft while it is accommodated in the bearing; and oil wicking means that includes a feeding tab disposed in the lubricant feed window, and a pick-up tip disposed in the notch and in oil capillary communication with the ends of the circumferentially extending oil capillary passage, said pick-up tip being in oil feeding communication with the feeding tab and in oil absorbing relation with the circumferentially extending oil capillary passage whereby leakage oil from the notched end of the bearing is recirculated through the pick-up tip to the feeding tab.

7. The invention of claim 6 wherein an oil absorbent mass is contained in the bearing and lubrication system and is in oil feeding communication with at least part of the oil wicking means; and wherein the system further comprises barrier means for limiting the feeding of oil directly to the feeding tab from the oil absorbent mass.

8. The invention of claim 7 wherein the system includes a bearing accommodating hub and a structural member spaced radially from and generally concentric with said hub, and wherein said barrier means comprises at least one structural wall extending radially from said hub toward said structural member.

9. The invention of claim 8 wherein said barrier means further comprises a second structural wall spaced circumferentially from said at least one structural wall so as to define a wicking means accommodating region therebetween; wherein at least part of the wicking means is disposed between the two walls, and wherein the walls inhibit oil transferring communication between the oil absorbent mass and said at least part of the wicking means.

10. The invention of claim 7 wherein said barrier means comprises at least one oil impervious membrane disposed between the oil absorbent mass and at least part of the wicking means whereby the supply of oil to the wicking means from the absorbent mass is inhibited, thereby to promote gradients in the oil depletion condition of the pick-up tip and feeding tab so that recirculation of leakage oil from said notch through the pick-up tip and to the feeding tab will be promoted.

11. A dynamoelectric machine bearing and lubrication system comprising: a bearing mounting hub structure having at least one reoiling passage therein, an axially extending bearing supported by the hub structure and having a lubricant feed window and circumferentially extending capillary walls that establish circumferentially extending capillary passages at each end of the bearing about a shaft accommodate in the bearing; and oil wicking means that includes a feeding tab disposed in the lubricant feed window, a first pick-up tip disposed in oil absorbing communication with the capillary passage at one end of the bearing, and a second pick-up tip disposed in oil absorbing communication with the capillary passage at the other end of the bearing, said first pick-up tip and second pick up tip each being in oil feeding communication with the feeding tab and in oil absorbing relation with the circumferentially extending capillary passages whereby end leakage oil from the bearing is recirculated through the pick-up tips to the feeding tab; and said wicking means being contoured and shaped so that an air pocket is defined between said wicking means and the entrance of the re-oiling passage in the hub structure so that oil added through the re-oiling passage may accumulate in the air pocket and be absorbed directly by the wicking means.

12. A dynamoelectric machine bearing and lubrication system comprising: a bearing mounting hub structure, an axially extending bearing supported by the hub structure and having a lubricant feed window and circumferentially extending capillary walls that establish circumferentially extending capillary passages at each end of the bearing about a shaft accommodated in the bearing; and oil wicking means that includes a feeding tab disposed in the lubricant feed window, a first pick-up tip disposed in oil absorbing communication with the capillary passage at one end of the bearing, and a second pick-up tip disposed in oil absorbing communication with the capillary passage at the other end of the bearing, said first pick-up tip and second pick-up tip each being in oil feeding communication with the feeding tab and in oil absorbing relation with the circumferentially extending capillary passage whereby end leakage oil from the bearing is recirculated through the pick-up tip to the feeding tab; said system further comprising an oil absorbent mass that establishes a reservoir of oil, and also further comprising barrier means for limiting the feeding of oil directly to the feeding tab from the oil absorbent mass.

13. The invention of claim 12 wherein barrier means includes a pair of circumferentially spaced apart radially extending walls that extend radially from the bearing mounting hub structure and accommodate at least part of the oil wicking means therebetween.

14. A method of assembling parts of a bearing system for a dynamoelectric machine having an end frame with a centrally located sleeve bearing accommodating hub with a frustro-conical end face, a bearing accommodating bore, and four post projecting axially from edges of such face, a flat spring steel thrust plate having four flatted corners and also having notches formed in at least two opposite edges thereof and a shaft accommodating hole in the central portion thereof, a cover having at least one circumferentially extending round inner wall, a sleeve bearing having a round axially extending bore, and wherein the end frame has a cylindrical external surface concentric with the bearing bore when the bearing is accommodated in the bearing accommodating bore; the method comprising: loosely fitting the thrust plate adjacent to the frusto-conical surface by interfitting the at least two notches with at least two of the posts; pressing the cover onto the cylindrical external surface of the end frame, and closely accommodating the four flatted corners of the thrust plate within the round inner wall of the cover, and thereby positioning the shaft accommodating hole of the thrust plate in concentric relation with the axially extending bore of the bearing.

15. A method of assembling a three-tailed lubricant feed wick having a nose projecting axially from one end thereof and three tabs extending laterally therefrom with a bearing having notches at axial ends thereof and a lubricant feed window in the central portion thereof and wherein the bearing is supported by a central hub structure of a dynamoelectric machine, the method comprising: moving the wick axially relative to the bearing with the nose moving past a first end notch in the bearing and a first tail of the wick moving axially past the first end notch, tilting the wick laterally relative to the bearing so as to raise a centrally located tail out of interfering relation with the end of the bearing and continuing to move the wick axially relative to the bearing so that centrally located tail approaches the feed window, and impinging a lateral portion of the nose against a portion of the hub structure, and continuing to move the wick in the same relative axial direction and thereby seating the centrally located tail in the bearing windown, a trailing tail in one end notch of the bearing, and camming the nose of the wick toward the center of the bearing and thereby seating the first wick tail at the nose end of the wick in the other bearing notch.

16. The method of claim 15 wherein the wick is sway backed and tilting the wick laterally relative to the bearing comprises moving the back of the wick into engagement with the hub structure; and wherein seating the tails in the respective window and notches also establishes an air pocket between the back of the wick and the hub structure to facilitate re-oiling.

17. A method of assembling and using a three-tailed lubricant feed wick having a nose projecting axially from one end thereof and three tabs extending laterally therefrom with a bearing having notches at axial ends thereof and a lubricant feed window in the central portion thereof and wherein the bearing is supported by a central hub structure of a dynamoelectric machine, the method comprising: moving the wick axially relative to the bearing with the nose moving past a first end notch in the bearing and a first tail of the wick moving axially past the first end notch, tilting the wick laterally relative to the bearing so as to raise a centrally located tail out of interfering relation with the end of the bearing and continuing to move the wick axially relative to the bearing so that the centrally located tail approaches the feed window, and impinging a lateral portion of the nose against a portion of the hub structure, and continuing to move the wick in the same relative axial direction and thereby seating the centrally located tail in the bearing window, a trailing tail in one end notch of the bearing, and camming the nose of the wick toward the center of the bearing and thereby seating the first wick tail at the nose end of the wick in the other bearing notch; and placing an oil absorbent material within parts of the hub structure in oil communicating relation to the feed wick, whereby oil may be fed to the bearing window, and whereby the end tails of the wick can recirculate leakage oil to the centrally located tail and bearing window.

* * * * *

UNITED STATES PATENT AND TRADEMARK OFFICE
CERTIFICATE OF CORRECTION

PATENT NO. : 4,055,370
DATED : October 25, 1977
INVENTOR(S) : Eldon R. Cunningham It is certified that error appears in the above-identified patent and that said Letters Patent are hereby corrected as shown below:

```
Abstract, line 6, delete "an" and insert   --a--.
Col. 2, line 42, delete "othe" and insert --other--;
        line 60, delete "recirculatroy" and insert
                --recirculatory--.
Col. 3, line 21, delete "if" and insert --it--;
        line 28, delete "mas" and insert --mass--;
        line 48, delete "bearng" and insert --bearing--.
Col. 5, line 40, after "is" (first occurrence) insert --a--;
        line 67, delete "staor" and insert --stator--.
Col. 6, line  4, delete "system" and insert --systems--;
        line 56, after the "," (comma) insert --the--.
Col. 8, line 66, delete "be" and insert --by--.
Col. 9, line 51, delete "," (comma) and insert --;--(semi-colon).
Col. 10, line 26, delete "accommodate" and insert --accommodated--
         line 60, delete "passage" and insert --passages--.
Col. 11, line  8, delete "post" and insert --posts--;
         line 42, after "that" insert --the--.
Col. 12, line  3, delete "windown" and insert --window--.
```

Signed and Sealed this

Thirteenth Day of June 1978

[SEAL]

Attest:

RUTH C. MASON
*Attesting Officer*

DONALD W. BANNER
*Commissioner of Patents and Trademarks*